United States Patent
Junqua et al.

(10) Patent No.: US 7,240,007 B2
(45) Date of Patent: Jul. 3, 2007

(54) SPEAKER AUTHENTICATION BY FUSION OF VOICEPRINT MATCH ATTEMPT RESULTS WITH ADDITIONAL INFORMATION

(75) Inventors: Jean-Claude Junqua, Santa Barbara, CA (US); Matteo Contolini, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 881 days.

(21) Appl. No.: 10/392,549

(22) Filed: Mar. 20, 2003

(65) Prior Publication Data

US 2003/0182119 A1  Sep. 25, 2003

Related U.S. Application Data

(63) Continuation-in-part of application No. 10/245,144, filed on Sep. 16, 2002, now abandoned, which is a continuation-in-part of application No. 10/022,023, filed on Dec. 13, 2001, now Pat. No. 7,124,085.

(51) Int. Cl.
*G10L 17/00* (2006.01)

(52) U.S. Cl. .................. 704/273; 704/246

(58) Field of Classification Search ............ None
See application file for complete search history.

(56) References Cited

U.S. PATENT DOCUMENTS

| | | | |
|---|---|---|---|
| 5,526,465 A | 6/1996 | Carey et al. | |
| 5,606,643 A * | 2/1997 | Balasubramanian et al. | 704/243 |
| 5,615,296 A * | 3/1997 | Stanford et al. | 704/270.1 |
| 5,897,616 A * | 4/1999 | Kanevsky et al. | 704/246 |
| 5,913,196 A * | 6/1999 | Talmor et al. | 704/270 |
| 5,915,001 A * | 6/1999 | Uppaluru | 379/88.22 |
| 6,219,640 B1* | 4/2001 | Basu et al. | 704/246 |
| 6,349,279 B1* | 2/2002 | Montacie et al. | 704/246 |
| 6,356,868 B1* | 3/2002 | Yuschik et al. | 704/246 |
| 6,456,698 B1 | 9/2002 | Morganstein et al. | |
| 6,477,500 B2 | 11/2002 | Maes | |
| 6,490,560 B1 | 12/2002 | Ramaswamy et al. | |
| 6,510,415 B1* | 1/2003 | Talmor et al. | 704/273 |
| 6,615,171 B1* | 9/2003 | Kanevsky et al. | 704/246 |
| 6,697,779 B1* | 2/2004 | Bellegarda et al. | 704/246 |
| 7,054,819 B1* | 5/2006 | Loveland | 704/273 |
| 2003/0110038 A1* | 6/2003 | Sharma et al. | 704/270 |

* cited by examiner

*Primary Examiner*—David D. Knepper
(74) *Attorney, Agent, or Firm*—Harness, Dickey & Pierce, PLC

(57) ABSTRACT

A speaker authentication system includes a data fuser operable to fuse voiceprint match attempt results with additional information to assist in authenticating a speaker providing audio input. In other aspects, the system includes a data store of speaker voiceprints and a voiceprint matching module adapted to receive an audio input and operable to attempt to assist in authenticating a speaker by matching the audio input to at least one of the speaker voiceprints. The voiceprint matching module adjusts a confidence of voiceprint match attempt results by at least one of: (a) a number of utterance repetitions upon which a matching speaker voiceprint has been trained; or (b) a passage of time since a training occurrence associated with a matching speaker voiceprint.

37 Claims, 3 Drawing Sheets

SPEAKER AUTHENTICATION BY FUSION OF VOICEPRINT MATCH ATTEMPT RESULTS WITH ADDITIONAL INFORMATION

CROSS-REFERENCE TO RELATED APPLICATIONS

This application is a continuation-in-part of U.S. patent application Ser. No. 10/022,023 filed on Dec. 13, 2001 now U.S. Pat. No. 7,124,085. This application is also a continuation-in-part of U.S. patent application Ser. No. 10/245,144 filed on Sep. 16, 2002 now abandoned. The disclosures of the above applications are incorporated herein by reference.

FIELD OF THE INVENTION

The present invention generally relates to speaker authentication systems and methods, and particularly relates to speaker voiceprint development and co-supplementation with data fusion of multi-modal input.

BACKGROUND OF THE INVENTION

Speaker authentication, such as speaker verification and speaker identification, over a telephone, for example, has challenged product and service providers who, in turn, have typically utilized call center personnel in combination with stringently structured voice prompt systems to elicit constrained responses from users via a telephone keypad. This methodology is time consuming for users, such that speech recognition and/or voiceprint recognition appear to be attractive speaker authentication tools. Unfortunately, speech recognition and voiceprint recognition can be inaccurate at least part of the time, and training procedures to improve speech and voiceprint recognition can be time consuming, thereby further inconveniencing the user. Moreover, attempts to adapt a speech recognition system to a particular speaker are substantially fruitless when the speaker has not yet been identified through an authentication process.

The need remains for a speaker authentication system and method that authenticates speakers based on speaker voiceprints, and improves reliability by fusing information, such as speaker keypad entries, speech recognition attempts, caller ID, and personal information database contents, to achieve more convenient and reliable speaker authentication with increased security. The need further remains for a speaker authentication system and method that implicitly develops speaker voiceprints without inconveniencing a user. The present invention meets the aforementioned needs.

SUMMARY OF THE INVENTION

In accordance with the present invention, a speaker authentication system includes a data fuser operable to fuse information to assist in authenticating a speaker providing audio input. In other aspects, the system includes a data store of speaker voiceprints and a voiceprint matching module adapted to receive an audio input and operable to attempt to assist in authenticating a speaker by matching the audio input to at least one of the speaker voiceprints.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
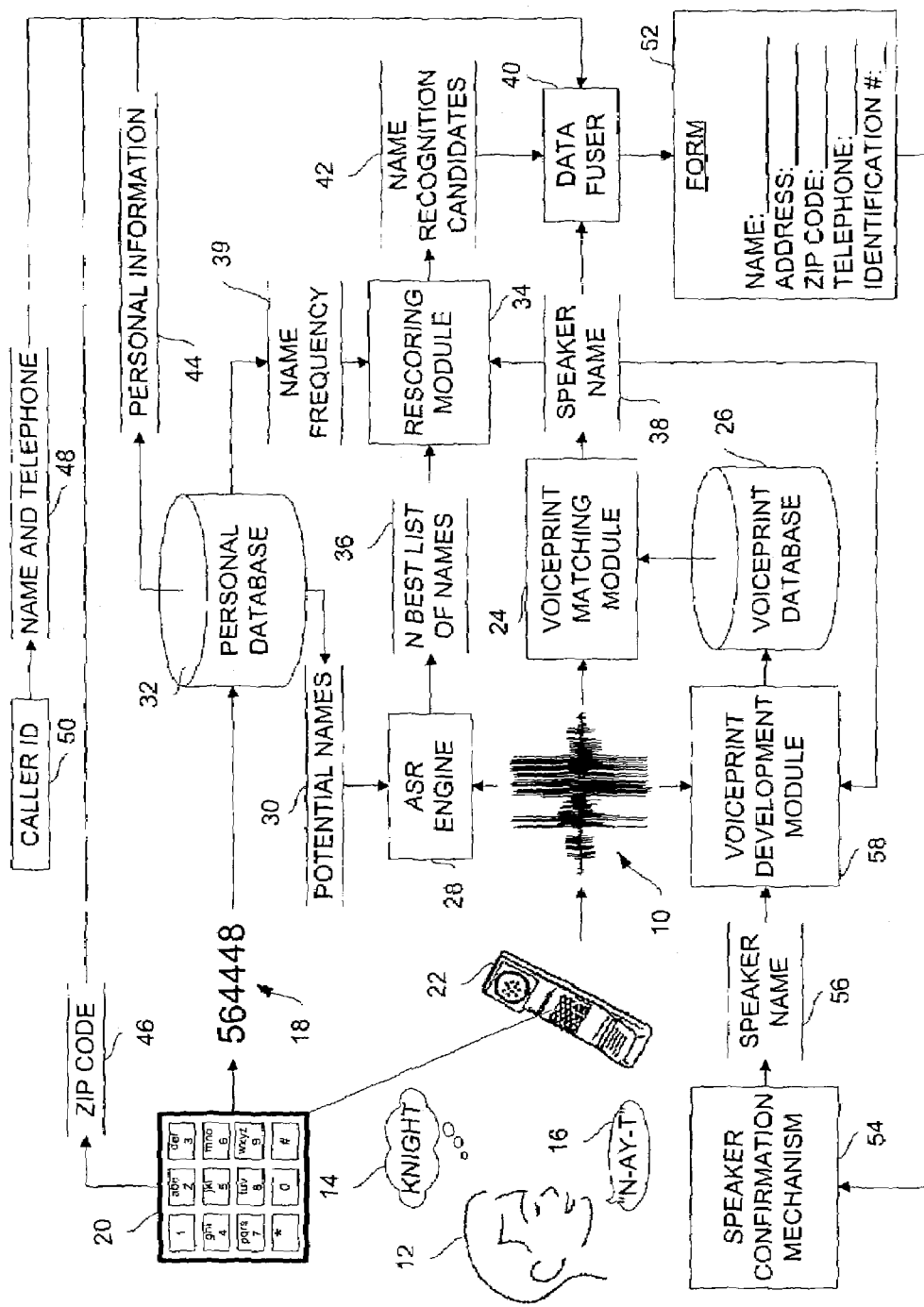
FIG. 1 is a partial-perspective block diagram illustrating a first embodiment of a speaker authentication system according to the present invention.

FIG. 1 illustrates a speaker authentication system having an audio input (not shown) adapted to receive a speech sample 10 of speaker 12 uttering the speaker's name 14 as at 16, and tones 18 generated by speaker 12 in the course of spelling speaker's name 14 via keypad 20 of telephone handset 22. Also, voiceprint matching module 24 is adapted to compare the speech sample 10 to a plurality of speaker voiceprints stored in database 26 in association with corresponding speaker names. In one embodiment, each speaker voiceprint is trained on speaker utterances of corresponding speaker names. Accordingly, module 24 uses dynamic time warping to match input speech samples to speaker-dependent pass phrases that preserve biometric information. Further, automatic speech recognizer 28 is adapted to perform speech recognition on speech sample 10 with reference to a constraint list 30 of potential speaker names generated from personal information database 32 via tones 18. Accordingly, recognizer 28 uses hidden markov modeling, for example, to perform recognition using speaker-independent speech models. Fusion of information from the keypad entry and speech recognition may be used to double check the voiceprint match attempt results 38, or to assist in identifying a speaker when a voiceprint for speaker 12 is not available.

Another way to use results of fusing tones 18 with recognition of speech sample 10 is to fuse the fusion results with voiceprint match attempt results 38. For example, rescoring module 34 is adapted to rescore an N best list 36 of names generated by recognizer 28 based on voiceprint match attempt results 38 corresponding to a speaker name generated by voiceprint matching module 24 as a result of voiceprint match with speech sample 10. Accordingly, names of list 36 may have their scores improved or worsened based on their similarity or dissimilarity with voiceprint match attempt results 38, and this increase may be dependent on a weight given to voiceprint match attempt results 38 during the rescoring process. This weight may be based, for example, on the training history of the corresponding voiceprint, such that a number of times the voiceprint has been updated can be taken into account, and one or more timestamps associated with the training occurrences can also be considered. Rescoring module 34 also uses frequency information 39 relating to frequency of appearance of names of list 36 in personal information database 32 when rescoring names of list 36. Further, data fuser 40 is adapted to fuse the name recognition candidates 42 with personal information 44 from database 32, a speaker zip code 46 entered via keypad 20, speaker location 48 provided by caller ID function 50, and/or voiceprint match attempt results 38 when filling requirements of electronic form 52. Accordingly, data fuser 40 is adapted to use the most reliable information from the various information sources, and eliminate unnecessary collection of information from the speaker; the speaker, for example, may not be prompted to provide a keypad entry if a speaker voiceprint match has an especially high confidence. Elimination of inconvenience to the speaker is combined with increased reliability.

Reliable authentication of speakers permits implicit development of speaker voiceprint models of database 26. For example, a speaker confirmation mechanism 54, such as a human agent at a call center requesting confirmation from speaker 12 of information in filled electronic form 52, provides a reliable speaker authentication even where intermediate fusion results are imperfect, such that final fusion results 56 are highly reliable. Voiceprint development module 58 may therefore confidently use the final fusion results 56 when constructing new voiceprints for new speakers, and when updating existing voiceprints for previously enrolled speakers. Accordingly, voiceprint development module 58 determines that a speaker is new if fusion results 56 do not match identifying information associated with any of the speaker voiceprints of database 26. Module 58 further determines that a speaker is not new based on fusion results 56 by matching fusion results 56 to voiceprint match attempt results 38 and/or at least one speaker voiceprint of database 26. A new speaker 12 is enrolled implicitly by constructing a new speaker voiceprint from speech sample 10 and associating it in database 26 with at least part of fusion results 56 that provides identifying information. An existing speaker voiceprint matching fusion results 56 is updated with appropriate portions of speech sample 10 of sufficient signal to noise ratio, and the number of repetitions of training utterances is tracked and used as a measure of voiceprint match confidence. Collection of speaker utterances over time increases the utility of the voiceprint matching mechanism without inconveniencing the speaker.

Voiceprint match confidence is related to voiceprint development occurrences. For example, a number of training utterance repetitions can be used as a measure for how confidently a match to the voiceprint should be treated, and therefore weight the rescoring process and/or render speech recognition and/or keypad entries unnecessary. Thus, following initial enrollment, a speaker is more and more confidently matched to a voiceprint over time with use of the system and consequent increase in training sample utterances. Eventually, the voiceprint match can become suitable for use in communicating confidential information to the speaker, such as communicating patient information to a designated physician. Call out systems adapted to telephone an enrolled speaker and communicate confidential information only upon successful authentication can thus be implemented. Also, one or more timestamps associated with update occurrences may be considered, such that a match to a recently trained voiceprint model may be considered more reliable than a match to another voiceprint model that has not been used in a long time, even where the other voiceprint model may have been updated several more times than the recently trained model. One way to accomplish this function is to use size of a vector of timestamps as the reference count for each time dependent state of the model, and either prune off older timestamps, thereby decreasing the reference count, or give higher weight to more recent update occurrences. Thus, enrolled speakers may return after a long absence to find that the system requires them to once again provide most or all of the pass phrase, and then find the requirement decrease again over time. The system may also occasionally require a frequent user to provide most or all of the pass phrase to ensure that less frequently matched (end portions) of the model have sufficiently recent training samples to render them useful.

Figure 2:
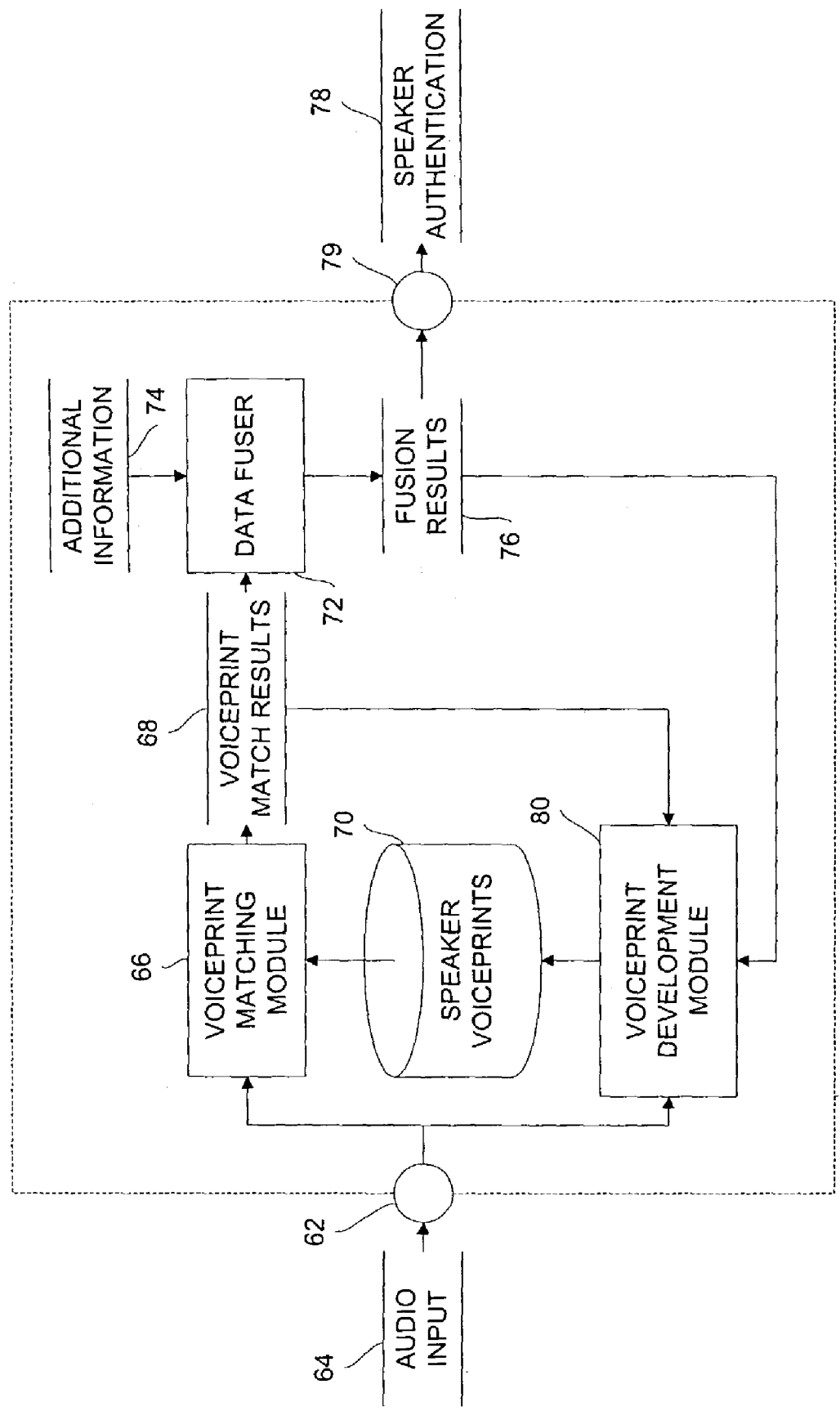
FIG. 2 is a partial-perspective block diagram illustrating a second embodiment of a speaker authentication system according to the present invention.

FIG. 2 illustrates a more general embodiment of the speaker authentication system 60 of the present invention. Therein, input 62 is operable to receive audio input 64, such as a speech sample and/or DTMF tones. Voiceprint matching module 66 is adapted to receive audio input 64 and to generate voiceprint match attempt results 68 by attempting to match the audio input to at least one of the speaker voiceprints of data store 70. A dialogue manager (not shown) may be employed to prompt the speaker for particular utterances and/or keypad entries at appropriate times, such that voiceprint matching module 66 attempts to assist in authenticating a speaker (not shown) based on a speaker utterance. Data fuser 72 assists in authenticating the speaker by fusing information.

There are several ways that data fuser 72 can fuse information according to the present invention. One example of information fusion includes fusing a speaker keypad entry relating to contents of a speech sample with the speech sample; recognizing a speaker utterance with reference to a constraint list generated via a speaker keypad entry is such an example. Another example of information fusion includes fusing voiceprint match attempt results 68 with additional information 74, such as a speaker keypad entry; comparing the voiceprint match attempt results 68 to a constraint list of names of potential speakers generated via the speaker keypad entry is such an example. Adapting a speech recognition process based on the voiceprint match attempt results 68 to improve recognition of the audio input 64 is another such example, and includes rescoring recognition results and/or selecting a speech model adapted to the speaker based on voiceprint match attempt results 68. Fusion results 76 are used to provide speaker authentication 78 in the form of a speaker identity to a client application (not shown) such as a form filling application or callout service via output 79, and a confirmation mechanism (not shown), such as a dialogue manager and/or human agent may be employed as part of the data fusion process to ensure reliability of fusion results 76.

Voiceprint development module 80 constructs and/or adapts speaker voiceprints of data store 70 based on the audio input and the fusion results 76. Accordingly, new voiceprints are developed from suitable audio input 64 and stored in data store 70 in association with fusion results 76; an existing voiceprint matching fusion results 76 and/or verification results 68 is updated with suitable audio input 64.

Figure 3:
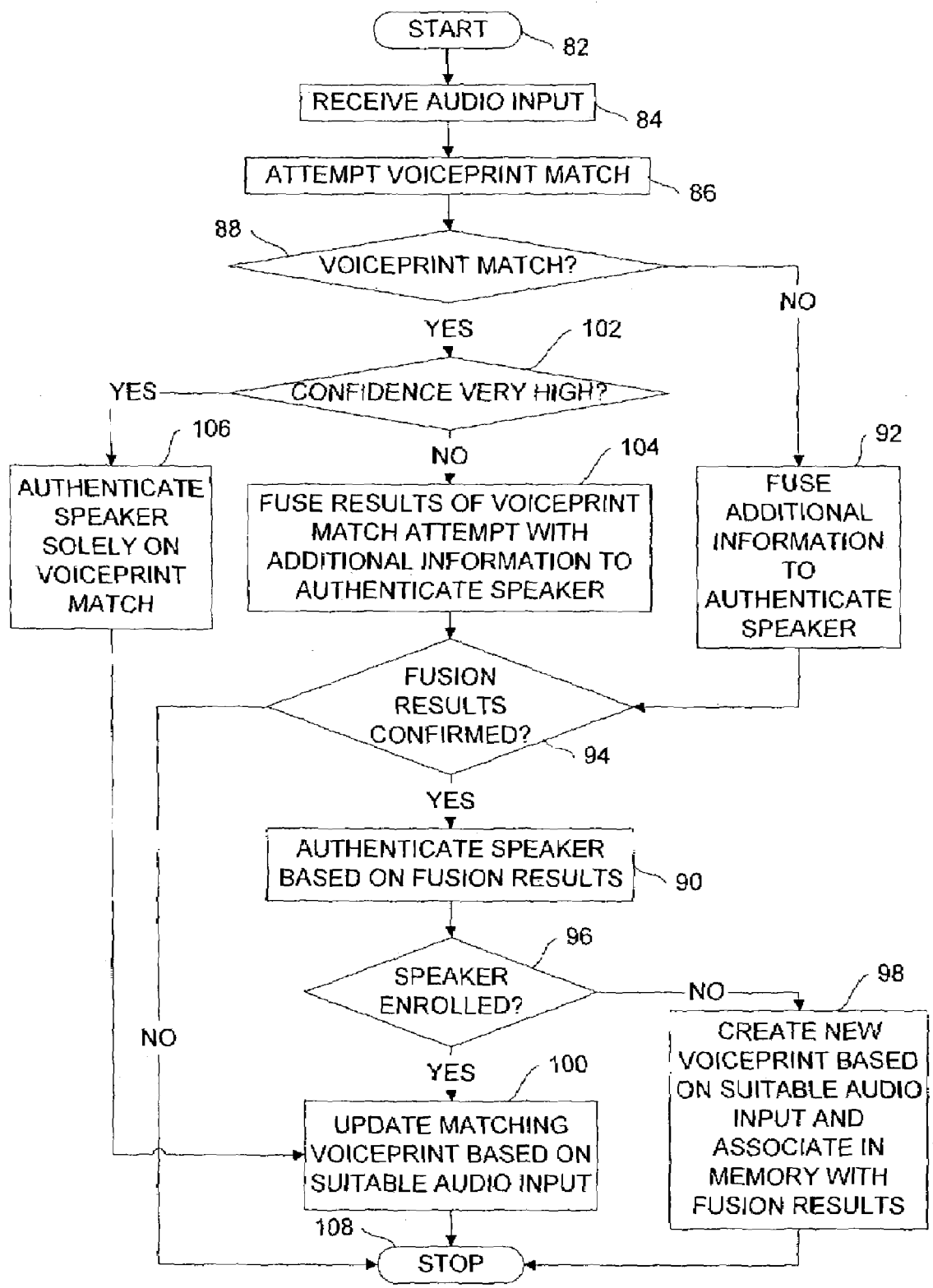
FIG. 3 is a flow diagram illustrating a method of speaker authentication according to the present invention.

FIG. 3 illustrates the method of the present invention. Beginning at 82, audio input is received at 84, potentially in response to one or more prompts for audio input of one or more particular types and relating to specific information content, such as a speaker identity; prompting speakers to speak their names and spell their names with a keypad is one such example. An attempt is made to match the audio input to a speaker voiceprint at step 86. If the attempt is not successful as at 88, then the speaker is alternatively authenticated at step 90 by an information fusion process at step 92 employing a confirmation mechanism as at 94. If the fusion results do not match an existing voiceprint as at 96, a new voiceprint is created at step 98 based on suitable audio input, and the new voiceprint is associated in memory with the fusion results. If, however, the fusion results do match an existing voiceprint as at 96, then the matching voiceprint is updated with suitable audio input at step 100.

If a matching voiceprint is found as at 88, and if the confidence in the match is not very high as at 102, then the voiceprint match attempt results are fused with additional information to authenticate the speaker at step 104. If the fusion results are confirmed as at 94, then the speaker is authenticated at step 90, and steps 96, 98, and 100 are further performed as above. However, if the confidence in the match is very high as at 102, then the speaker is authenticated based solely on the voiceprint match at step 106, and the matching voiceprint is updated based on suitable audio input at 100. Although the method ends at 108, it should be readily understood that unconfirmed fusion results may result in more laborious authentication of the speaker by alternative means, and that the resulting reliable speaker authentication can be employed as confirmed fusion results at steps 90, 96, 98, and 100.

The description of the invention is merely exemplary in nature and, thus, variations that do not depart from the gist of the invention are intended to be within the scope of the invention. For example, although the speaker's name is employed throughout the application as an example of a speaker identity, other forms of speaker identity may be employed. Accordingly, voiceprints based on alternative utterances may be employed, such as social security numbers, license numbers, customer numbers, and residence information. Also, utterances spelling the speaker's name may be used to provide lengthier pass phrases that extract word-level voiceprint statistics and preserve co-articulation phenomena specific to each speaker. Further, implementations anticipating availability of different user interfaces to a speaker may be modified to take advantage of alternative interface modalities. Still further, the term "speaker authentication" is employed herein to refer to speaker verification and/or speaker identification processes, and it should be readily understood that voiceprint matching can be a speaker verification and/or a speaker identification process; similarly, voiceprints in accordance with the present invention can take various forms suitable for a particular application goal. Such variations are not to be regarded as a departure from the spirit and scope of the invention.

What is claimed is:

1. A speaker authentication system, comprising:
   a data store of speaker voiceprints;
   a voiceprint matching module adapted to receive an audio input and operable to attempt to assist in authenticating a speaker by matching the audio input to at least one of the speaker voiceprints; and
   a data fuser operable to fuse voice print match attempt results with additional information to assist in authenticating a speaker providing the audio input,
   wherein said voiceprint matching module is operable to adjust a confidence of voiceprint match attempt results by at least one of: (a) a number of utterance repetitions upon which a matching speaker voiceprint has been trained; or (b) a passage of time since a training occurrence associated with a matching speaker voiceprint.

2. The system of claim 1, comprising a communication mechanism adapted to initiate communication with a speaker, elicit audio input from the speaker, employ said voiceprint matching module and said data fuser to attempt to authenticate the speaker, and deliver confidential information to the speaker only if the attempt to authenticate the speaker is successful.

3. The system of claim 1, wherein said data fuser is operable to fuse the voiceprint match attempt results with a speaker keypad entry.

4. The system of claim 3, wherein said data fuser is operable to compare the voiceprint match attempt results to a constraint list of names of potential speakers generated via the speaker keypad entry.

5. The system of claim 1, wherein said data fuser is operable to adapt a speech recognition process based on the voiceprint match attempt results to improve recognition of the audio input.

6. The system of claim 5, wherein said data fuser is operable to rescore results of speech recognition based on the voiceprint match attempt results.

7. The system of claim 6, wherein said data fuser is operable to improve the score of a recognition candidate matching the voiceprint match attempt results.

8. The system of claim 7, wherein said data fuser is operable to worsen a score of a recognition candidate not matching the voiceprint match attempt results.

9. The system of claim 8 wherein an amount by which the score is improved or worsened is dependent upon a weight, and said data fuser is operable to adjust the weight given to the voiceprint match attempt results based on a number of utterance repetitions upon which a matching speaker voiceprint has been trained.

10. The system of claim 8 wherein an amount by which the score is improved or worsened is dependent upon a weight, and said data fuser is operable to adjust the weight given to the voiceprint match attempt results based on a passage of time since a training occurrence associated with a matching speaker voiceprint.

11. The system of claim 1 comprising a voiceprint development module operable to adapt a speaker voiceprint based on the audio input.

12. The system of claim 11, wherein said voiceprint development module is operable to decide whether to adapt the speaker voiceprint based on the fusion results.

13. The system of claim 1 comprising a voiceprint development module operable to construct a speaker voiceprint based on the audio input and associate it in said data store with fusion results.

14. The system of claim 13, wherein said voiceprint development module is operable to decide whether to construct the speaker voiceprint based on whether the fusion results match at least one speaker voiceprint stored in said data store.

15. The system of claim 1, wherein said data fuser is operable to fuse a speaker keypad entry relating to contents of a speech sample with the speech sample.

16. The system of claim 1, wherein said voiceprint matching module employs size of a vector of timestamps as a reference count for each time dependent state of a voiceprint model, and either prunes off older time stamps, or gives higher weight to more recent update occurrences.

17. The system of claim 16, wherein, said voice print matching module periodically requires speakers to provide most or all of a passphrase in order to ensure that less frequently matched portions of the its model have sufficiently recent training samples to render them useful.

18. A method of speaker authentication, comprising:
    receiving audio input;
    attempting to assist in authenticating a speaker by matching the audio input to at least one speaker voiceprints;

fusing voiceprint match attempt results with additional information to assist in authenticating a speaker providing the audio input; and adjusting a confidence of voiceprint match attempt results by at least one of: (a) a number of utterance repetitions upon which a matching speaker voiceprint has been trained; or (b) a passage of time since a training occurrence associated with a matching speaker voiceprint.

19. The method of claim 18, comprising:
initiating communication with the speaker;
eliciting the audio input from the speaker; and
delivering confidential information to the speaker only if an attempt to authenticate the speaker is successful.

20. The method of claim 18, wherein said fusing the speaker verification with additional information includes fusing the voiceprint match attempt results with a speaker keypad entry.

21. The method of claim 20, wherein said fusing the speaker verification with the speaker keypad entry includes comparing the voiceprint match attempt results to a constraint list of names of potential speakers generated via the speaker keypad entry.

22. The method of claim 18, wherein said fusing the speaker verification with additional information includes adapting a speech recognition process based on the voiceprint match attempt results to improve recognition of the audio input.

23. The method of claim 18, wherein said adapting a speech recognition includes rescoring results of speech recognition based on the voiceprint match attempt results.

24. The method of claim 23, wherein said rescoring results of speech recognition based on the voiceprint match attempt results includes improving the score of a recognition candidate matching the voiceprint match attempt results.

25. The method of claim 24, wherein said rescoring results of speech recognition based on the voiceprint match attempt results includes worsening a score of a recognition candidate not matching the voiceprint match attempt results.

26. The method of claim 25, wherein an amount by which the score is improved or worsened is dependent upon a weight, and comprising adjusting the weight given to the voiceprint match attempt results based on a number of utterance repetitions upon which a matching speaker voiceprint has been trained.

27. The method of claim 25, wherein an amount by which the score is improved or worsened is dependent upon a weight, and comprising adjusting the weight given to the voiceprint match attempt results based on a passage of time since a training occurrence associated with a matching speaker voiceprint.

28. The method of claim 18 comprising adapting a speaker voiceprint based on the audio input.

29. The method of claim 28 comprising deciding whether to update the speaker voiceprint based on whether fusion results match the voiceprint.

30. The method of claim 18 comprising constructing a speaker voiceprint based on the audio input and associating it in a data store with fusion results.

31. The method of claim 30 comprising deciding whether to construct the speaker voiceprint based on whether the fusion results match at least one speaker voiceprint stored in the data store.

32. The method of claim 18, wherein said fusing information includes fusing a speaker keypad entry relating to contents of a speech sample with the speech sample.

33. A multi-modal speaker authentication system adapted to implicitly enroll new speakers, comprising:
an input receptive of a speech sample and a keypad entry provided by a speaker of the speech sample;
a voiceprint matching module adapted to receive a speech sample and attempt to assist in authorizing the speaker by matching the speech sample to a plurality of speaker voiceprints; and
a speech recognizer adapted to receive the speech sample, the keypad entry provided by the speaker, and voiceprint match attempt results, and adapted to assist in authorizing the speaker based on the speech sample, the keypad entry, and voiceprint match attempt results;
wherein said voiceprint matching module is operable to adjust a confidence of voiceprint match attempt results by at least one of: (a) a number of utterance repetitions upon which a matching speaker voiceprint has been trained; or (b) a passage of time since a training occurrence associated with a matching speaker voiceprint.

34. The system of claim 33, comprising a dialogue manager adapted to prompt the speaker for the speech sample and the keypad entry.

35. The system of claim 33, comprising a voiceprint development module adapted to implicitly enroll a new speaker by developing a speaker voiceprint based on the speech sample and storing it in memory in association with speaker authentication attempt results.

36. The system of claim 33, wherein said speech recognizer has a constraint database of speaker identities adapted to generate a constraint list of speaker identities based on the keypad entry, and said speech recognizer has a rescoring module adapted to rescore speaker identity recognition candidates based on voiceprint match attempt results.

37. The system of claim 33, wherein said voiceprint development module is adapted to implicitly update an existing voiceprint for an enrolled speaker by adapting a matching speaker voiceprint based on the speech sample.

* * * * *